US011359719B2

(12) United States Patent
Ohnemus et al.

(10) Patent No.: US 11,359,719 B2
(45) Date of Patent: Jun. 14, 2022

(54) SHIFTING DEVICE FOR SHIFTING A TRANSMISSION

(71) Applicant: Bayerische Motoren Werke Aktiengesellschaft, Munich (DE)

(72) Inventors: Ulrich Ohnemus, Hattenhofen (DE); Fritz Pobitzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 13 days.

(21) Appl. No.: 14/603,459

(22) Filed: Jan. 23, 2015

(65) Prior Publication Data
US 2015/0300489 A1    Oct. 22, 2015

Related U.S. Application Data

(63) Continuation of application No. PCT/EP2013/062491, filed on Jun. 17, 2013.

(30) Foreign Application Priority Data

Jul. 24, 2012 (DE) ..................... 10 2012 212 910.3

(51) Int. Cl.
*F16H 63/20* (2006.01)
*F16H 63/30* (2006.01)
(Continued)

(52) U.S. Cl.
CPC ........... *F16H 63/20* (2013.01); *F16H 3/0915* (2013.01); *F16H 61/26* (2013.01);
(Continued)

(58) Field of Classification Search
CPC ........ F16H 3/38; F16H 59/041; F16H 59/042; F16H 63/08; F16H 63/16; F16H 63/30;
(Continued)

(56) References Cited

U.S. PATENT DOCUMENTS 1,118,389 A   11/1914 Austin
1,928,782 A   10/1933 Church
(Continued)

FOREIGN PATENT DOCUMENTS

CN   101865247 A   10/2010
CN   101865252 A   10/2010
(Continued)

OTHER PUBLICATIONS

International Search Report (PCT/ISA/210) dated Aug. 20, 2013, with English translation (Eight (8) pages).
(Continued)

*Primary Examiner* — Bobby Rushing, Jr.
(74) *Attorney, Agent, or Firm* — Crowell & Moring LLP

(57) ABSTRACT

Shifting device for shifting a transmission, having a first group of shift elements and a second group of shift elements, a selector shaft, which is arranged in such a way that it can be moved in translation along a longitudinal axis and rotated about the longitudinal axis, wherein it is possible, by moving the selector shaft into one of a plurality of possible translational positions, to select at least one shift element of the first group and at least one shift element of the second group and, by rotating the selector shaft, to actuate the selected shift elements. The at least one selected shift element of the first group can be actuated in phase or with an overlapping phase displacement or an offset phase displacement with respect to the at least one selected shift element of the second group.

18 Claims, 4 Drawing Sheets

(51) Int. Cl.
*F16H 3/08* (2006.01)
*F16H 3/091* (2006.01)
*F16H 61/26* (2006.01)
*F16H 61/04* (2006.01)

(52) U.S. Cl.
CPC ....... *F16H 63/3069* (2013.01); *F16H 63/206* (2013.01); *F16H 2003/0826* (2013.01); *F16H 2061/0418* (2013.01); *F16H 2063/202* (2013.01)

(58) Field of Classification Search
CPC ...... F16H 63/20; F16H 63/3073; F16H 61/26; F16H 2003/0826; F16H 61/0403; F16H 61/2061; F16H 61/0418; F16H 2306/48
USPC ................... 74/335, 473.1, 473.36, 325, 329
See application file for complete search history.

(56) References Cited

U.S. PATENT DOCUMENTS

| | | | | |
|---|---|---|---|---|
| 2,157,592 | A * | 5/1939 | Casler | F16H 61/30 192/3.57 |
| 3,429,194 | A * | 2/1969 | Jackel | F16H 63/18 74/337.5 |
| 4,155,271 | A | 5/1979 | Wolfe | |
| 4,335,623 | A * | 6/1982 | Kronstadt | F16H 63/20 74/473.21 |
| 4,373,403 | A | 2/1983 | Malott et al. | |
| 6,634,247 | B2 * | 10/2003 | Pels | B60K 6/24 477/6 |
| 7,353,726 | B2 | 4/2008 | Beer et al. | |
| 2002/0033059 | A1 | 3/2002 | Pels et al. | |
| 2007/0089556 | A1 * | 4/2007 | Kim | F16H 63/20 74/473.3 |
| 2009/0215587 | A1 * | 8/2009 | Gierer | F16H 61/0206 477/132 |
| 2010/0257953 | A1 | 10/2010 | Rieger et al. | |
| 2010/0257966 | A1 | 10/2010 | Rieger et al. | |

FOREIGN PATENT DOCUMENTS

| | | | |
|---|---|---|---|
| DE | 32 02 517 A1 | 8/1982 | |
| DE | 101 33 695 A1 | 3/2002 | |
| DE | 102 53 471 A1 | 8/2004 | |
| DE | 10 2004 051 602 A1 | 4/2006 | |
| DE | 10 2006 061 605 A1 | 7/2008 | |
| DE | 10 2009 025 452 A1 | 12/2010 | |
| DE | 10 2010 043 685 A1 | 5/2012 | |
| DE | 10 2012 204 562 A1 | 9/2013 | |
| WO | WO-2012159794 A1 * | 11/2012 | F16H 3/006 |

OTHER PUBLICATIONS

German Office Action dated Apr. 9, 2013 (Five (5) pages).
Chinese Office Action issued in corresponding Chinese Application No. 201380024804.9 dated Oct. 10, 2015 with English translation (14 pages).
Chinese Office Action issued in counterpart Chinese Application No. 201380024804.9 dated Jul. 5, 2016 with English translation (11 pages).
Chinese Office Action issued in Chinese counterpart application No. 201380024804.9 dated Jan. 3, 2017, with English translation (Five (5) pages).
European Office Acton issued in European counterpart application No. 13 729 708.1-1013 dated Jul. 12, 2018 (Seven (7) pages).

* cited by examiner

SHIFTING DEVICE FOR SHIFTING A TRANSMISSION

CROSS REFERENCE TO RELATED APPLICATIONS

This application is a continuation of PCT International Application No. PCT/EP2013/062491, filed Jun. 17, 2013, which claims priority under 35 U.S.C. § 119 from German Patent Application No. 10 2012 212 910.3, filed Jul. 24, 2012, the entire disclosures of which are herein expressly incorporated by reference.

BACKGROUND AND SUMMARY OF THE INVENTION

The present invention relates to a shifting device for shifting a transmission in a vehicle.

A method for shifting a transmission in accordance with the "duo-synchro principle" is known from the earlier German Patent Application DE 10 2012 204 562.7, which is not a prior publication. This transmission is a manually shifted transmission, i.e. a transmission in which the individual shift elements are shifted by hand in a purely mechanical manner. A manually shifted transmission of this kind does not require any shift actuators or shift sensors. The method described there is distinguished by the fact that in all cases precisely two shift elements are closed ("duo-synchro shift") to achieve each of the possible target shift states, this being done in succession in the sense of non-simultaneously.

It is the object of the present invention to provide a shifting device which allows such duo-synchro shifts in a manually shifted transmission.

This and other objects are achieved by a shifting device for shifting a transmission, having a first group of shift elements, a second group of shift elements, and a selector shaft, which is arranged such that it can be moved in translation along a longitudinal axis and rotated about the longitudinal axis. By moving the selector shaft into one of a plurality of possible translational positions, it is possible to select at least one shift element of the first group and at least one shift element of the second group and, by rotating the selector shaft, to actuate the selected shift elements, wherein the at least one selected shift element of the first group can be actuated in phase or with an overlapping phase displacement or an offset phase displacement with respect to the at least one selected shift element of the second group.

The starting point of the invention is a shifting device for shifting a transmission which has a first group of shift elements and a second group of shift elements. The shift elements can be shift collars (sliding sleeves), for example, to each of which a synchronizing device can be assigned. The shifting device has a selector shaft which is arranged in such a way that it can be moved in translation along a longitudinal axis of the selector shaft and additionally rotated about the longitudinal axis thereof. By moving the selector shaft into one of a plurality of possible translational positions, at least one shift element of the first group and at least one shift element of the second group can be selected.

In respect of a vehicle fitted with a manually shifted transmission, the translational movement of the selector shaft corresponds to the selection of individual shift gates, e.g. the shift gate formed by gears 1 and 2 or the shift gate formed by gears 3 and 4, etc. in the case of an H shift pattern. In each of the possible translational positions of the selector shaft, it can be rotated. The rotation of the selector shaft corresponds to the engagement or disengagement of one gear in a shift gate.

The invention consists in that, in at least one translational position of the selector shaft (i.e. in at least one of the shift gates of the shift lever or of the transmission), it is possible, by rotating the selector shaft, to actuate at least two shift elements, more specifically in such a way that the at least one selected shift element of the first group can be actuated in phase or with an overlapping phase displacement or an offset phase displacement with respect to the at least one selected shift element of the second group. In other words, the at least one selected shift element of the first group is actuated in phase with respect to time or in parallel with respect to time, with an overlapping phase displacement or with a time overlap or with an offset phase displacement with respect to the at least one selected shift element of the second group. Transmissions which permit a "duo-synchro shift" of this kind can be of very compact construction.

The selector shaft can be arranged transversely to a longitudinal direction of the transmission, in particular transversely to an input or output shaft of the transmission.

According to an embodiment of the invention, the selector shaft has a first "master element", which is assigned to the first group of shift elements, and a second "master element", which is assigned to the second group of shift elements. The two master elements can be coupled in rotation to the selector shaft or connected rigidly to the selector shaft. The term "master element" should be interpreted in an extremely broad manner. In very general terms, it refers to elements which transmit a control movement (rotary movement of the selector shaft) directly or indirectly to the shift elements to be shifted.

For example, provision can be made for a plurality of first "slave elements" to be assigned to the first group of shift elements, wherein each of the first slave elements is coupled to at least one shift element of the first group. The first master element of the selector shaft interacts with at least one of the first slave elements according to the instantaneous sliding position of the selector shaft, more specifically such that a rotary movement of the selector shaft and of the first master element coupled thereto is transmitted to the at least one slave element of the first slave elements which is associated with the respective sliding position, and is transmitted from said at least one slave element to the at least one shift element of the first group which is coupled thereto.

In respect of the second group of shift elements, the mode of operation is very similar. Accordingly, a plurality of second slave elements is assigned to the second group of shift elements. Each of the second slave elements is coupled to at least one shift element of the second group. The second master element interacts with at least one of the second slave elements according to the sliding position of the selector shaft, more specifically such that a rotary movement of the shift elements and of the second master element coupled thereto is transmitted to the at least one slave element of the second slave elements which is associated with the respective sliding position, and is transmitted from said slave element to the at least one shift element of the second group which is coupled thereto.

The slave elements can be frame-type elements for example, which can be completely closed or partially open. Each of the slave elements has a "slotted track". In the case of a closed frame-type slave element, this can be a closed "internal slotted track". The slotted track of a slave element interacts with the associated master element such that, when the selector shaft is turned, the master element slides on or along the slotted track or such that the master element rolls on the slotted track. The first and/or second master element can be designed as a lever-type element, for example. A sliding block interacting with the slotted track can be arranged on one free end of the lever-type element. As an alternative, a roller or the like can be arranged on one end of the lever-type element, rolling on the slotted track when the selector shaft is turned and, in the process, moving the relevant slave element in translation.

In particular, the first and/or second master element can be designed as a double-armed lever. A sliding block, a roller or the like, which interacts with a slotted track of a slave element, can be arranged on each of the two free ends of the double-armed lever.

The master elements and slave elements are preferably matched to one another in such a way that, when the selector shaft is turned (engagement or disengagement of a gear), starting from a state in which all the shift elements are open (neutral position or idling position), it is the case that, in all possible shift operations, one shift element of the first group always begins to close first and only after one shift element of the first group has begun to close does one shift element of the second group begin to close. This is entirely characteristic of a "duo-synchro shift".

Provision can be made for one shift element of the first group to be coupled to at least two first slave elements. This means that a shift element of the first group can be actuated into different translational positions of the selector shaft. In an entirely analogous way, provision can be made for at least one shift element of the second group to be coupled to at least two second slave elements.

The first slave elements and the second slave elements can each be arranged one behind the other in a first row or a second row, respectively.

As already mentioned, the slave elements can be designed as substantially flat sliding frames, for example, allowing very compact, register-type arrangement of the first slave elements one behind the other and of the second slave elements one behind the other.

According to an embodiment of the invention, the shifting device has a manually actuable shift lever, which can be arranged in the region of a center console of a vehicle, for example. The shift lever is coupled purely mechanically to the selector shaft. Pivoting the shift lever in a vehicle transverse direction causes translation of the selector shaft in the longitudinal direction thereof, thereby allowing individual shift gates to be selected. By pivoting the shift lever in a vehicle longitudinal direction it is possible to turn the selector shaft, allowing engagement or disengagement of individual gears in the shift gate, as already mentioned.

If the transmission is considered from the transmission input shaft in the direction of the transmission output shaft, it is possible to envisage that the first group of shift elements be arranged closer to the transmission output shaft than the second group of shift elements. In principle, however, the reverse is also possible. It is also possible for the first group of shift elements ("primary synchros") to be arranged closer to the transmission input shaft than the second group of shift elements ("secondary synchros").

A latching device or, preferably, a plurality of latching devices is preferably provided, which latch the selector shaft in a defined manner in a plurality of translational positions corresponding to the individual shift gates, allowing "clean" engagement and disengagement of gears.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
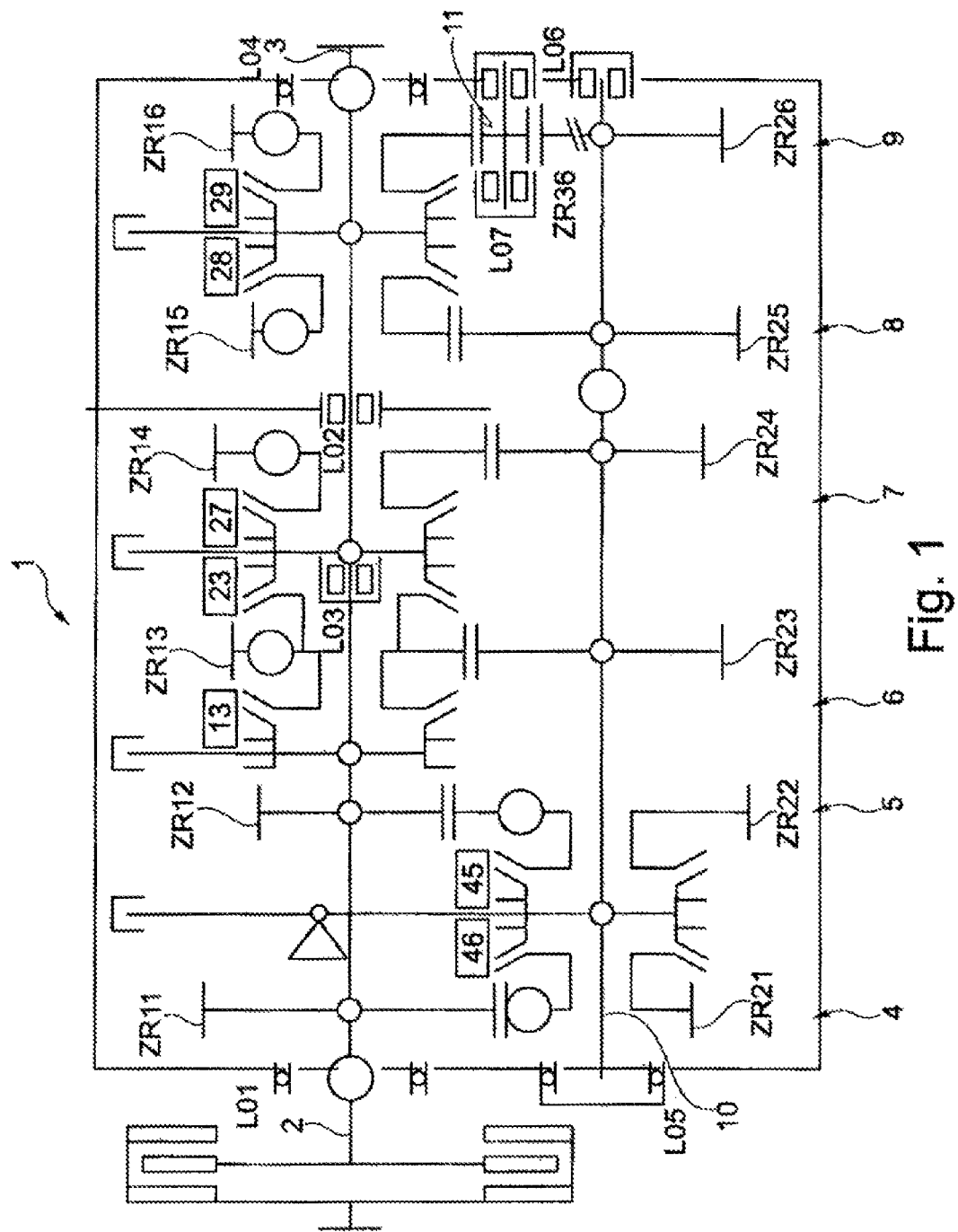
FIG. 1 is a schematic diagram of an illustrative embodiment of a seven-speed manually shifted transmission which can be shifted according to the "duo-synchro principle"

FIG. 1 shows a manually shifted transmission 1, which has a transmission input shaft 2 and a transmission output shaft 3.

The manually shifted transmission 1 has a total of six gearwheel planes 4-9. The first gearwheel plane 4 is formed by a gearwheel ZR11, which is arranged for conjoint rotation on the transmission input shaft 2, and a gearwheel ZR21, meshing therewith, which is mounted rotatably on a countershaft 10 arranged parallel to the transmission input shaft 2.

The second gearwheel plane 5 is formed by the two gearwheels ZR12 and ZR22. Gearwheel ZR12 is arranged for conjoint rotation on the transmission input shaft 2 and meshes with gearwheel ZR22, which is arranged rotatably on the countershaft 10.

The third gearwheel plane is formed by the two gearwheels ZR13 and ZR23. Gearwheel ZR13 is arranged rotatably on the transmission input shaft 2. It meshes with gearwheel ZR23, which is arranged for conjoint rotation on the countershaft 10.

The fourth gearwheel plane 7 is formed by the two gearwheels ZR14 and ZR24. Gearwheel ZR14 is arranged rotatably on the transmission output shaft 3 and meshes with gearwheel ZR24, which is arranged for conjoint rotation on the countershaft 10.

The fifth gearwheel plane is formed by the two gearwheels ZR15 and ZR25. Gearwheel ZR15 is arranged rotatably on the transmission output shaft 3 and meshes with gearwheel ZR25, which is arranged for conjoint rotation on the countershaft 10.

The sixth gearwheel plane is formed by the two gearwheels ZR16 and ZR26. Gearwheel ZR16 is arranged rotatably on the transmission output shaft 3 and meshes with an idler gear 11, which in turn meshes with gearwheel ZR26, which is arranged for conjoint rotation on the countershaft 10.

Gearwheels ZR21, ZR22, ZR13, ZR14, ZR15, ZR16, which are arranged rotatably on their respective shafts, are selectable gearwheels, i.e. gearwheels which can be coupled for conjoint rotation to the relevant shaft by actuating an associated shift element, which can be formed by a sliding collar, for example. A shift element of this kind consists of a sliding collar and of a synchronization device based on the Borg Warner principle, for example, having a single, double or triple friction cone system and correspondingly designed clutch toothing. By means of a shift element of this kind, a gearwheel rotatably mounted on a shaft can be synchronized with the shaft and, after synchronization, coupled in rotation to the shaft.

Thus, gearwheel ZR21 can be brought into engagement with shift element 46 and thus coupled in rotation to the countershaft 10. Gearwheel ZR22 can be brought into engagement with shift element 45 and thus coupled in rotation to the countershaft 10.

Gearwheel ZR13 can optionally be brought into engagement with shift element 13 and thus coupled in rotation to the transmission input shaft 2 and/or brought into engagement with shift element 23 and thus coupled in rotation to the transmission output shaft 3. If gearwheel ZR13 is brought into engagement simultaneously with the two shift elements 13 and 23, the transmission input shaft 2 is thereby coupled in rotation directly to the transmission output shaft 3 (direct gear).

Gearwheel ZR14 can be brought into engagement with shift element 27 and thus coupled in rotation to the transmission output shaft 3. Gearwheel ZR15 can be brought into engagement with shift element 28 and thus coupled in rotation to the transmission output shaft 3. Gearwheel ZR16 can be brought into engagement with shift element 29 and thus coupled in rotation to the transmission output shaft 3.

As can be seen from FIG. 1, individual gearwheels, namely gearwheels ZR21, ZR22, ZR13, ZR14, ZR15 and ZR16, which have already been mentioned several times, can be selected both on the transmission input shaft 2 and on the transmission output shaft 3 as well as on the countershaft 10 in the manually shifted transmission 1 shown there.

Figures 2, 3:
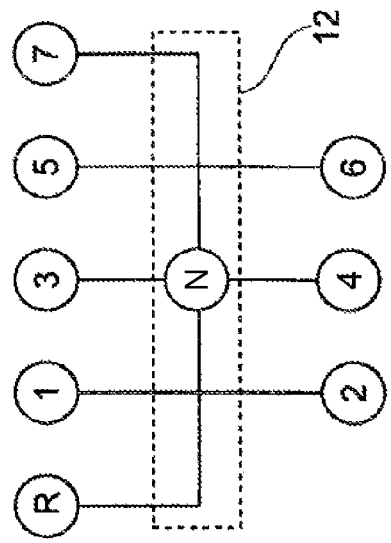
FIG. 2 shows a shift matrix intended to illustrate the individual shift operations of the transmission in FIG. 1.
FIG. 3 shows a possible shift pattern for the transmission shown in FIG. 1.

With the manually shifted transmission 1 shown in FIG. 1, seven forward gears (gears 1 to 7) and one reverse gear R can be formed. The shift matrix shown in FIG. 2 illustrates the shift state of the shift elements 13, 23, 27, 28, 29, 45 and 46 for the individual shift states or gears. An "X" means that the respective shift element is closed, i.e. that it is in engagement with the associated gearwheel. Empty spaces in the table mean that the respective shift elements are open.

As already mentioned above, precisely two shift elements are in engagement in each gear. All the other shift elements are open. To engage a gear, there is a "defined shift sequence", which is distinguished by the fact that either (a) that shift element of the two shift elements that have to be closed for a particular gear which is situated closer to the transmission output in the direction of power flow is closed first, followed by that shift element of the two shift elements that have to be closed for a particular gear which is situated closer to the transmission input, or (b) vice versa.

To engage reverse gear, the two shift elements 45 and 29 must be closed, wherein, in case a) (see above), shift element 29 is closed first, and only then is shift element 45 closed, or, in case b), shift element 45 is closed first, and only then is shift element 29 closed. In reverse gear, torque is transmitted from the transmission input shaft 2 via gearwheel ZR12 to gearwheel ZR22 and, from the latter, via shift element 45 to the countershaft 10. From the countershaft 10, torque is transmitted via gearwheel ZR26 to the idler gear 11 and, from the latter, to gearwheel 16 and onward, via shift element 29, to the transmission output shaft 3.

To engage first gear, the two shift elements 45 and 28 must be closed, and, here too, the shift element 28 "closer" to the transmission output shaft 3 is closed first, and only then is shift element 45 closed. In first gear, the torque is transmitted from the transmission input shaft 2 via gearwheels ZR12 and ZR22 and shift element 45 to the countershaft 10 and, from the latter, via gearwheels ZR25 and ZR15 and shift element 28 to the transmission output shaft 3.

To engage second gear, shift elements 45 and 23 must be closed, wherein here shift element 23 is closed first, and then shift element 45. In second gear, torque is transmitted from the transmission input shaft 2 via gearwheels ZR12 and ZR22 and shift element 45 to the countershaft 10 and, from the latter, via gearwheels ZR23 and ZR13 and the shift element 23 to the transmission output shaft 3.

To engage third gear, shift elements 13 and 28 must be closed, wherein shift element 28 is closed first, and only then is shift element 13 closed. In third gear, torque is transmitted from the transmission input shaft 2 via shift element 13 to gearwheel ZR13 and, from the latter, to gearwheel ZR23. Gearwheel ZR23 is coupled in rotation to the countershaft 10. Thus, the torque is transmitted onward via gearwheels ZR25 and ZR15 and shift element 28 to the transmission output shaft 3.

To engage fourth gear, shift elements 46 and 23 must be closed, wherein shift element 23 is closed first, and then shift element 46 is closed. In fourth gear, torque is transmitted from the transmission input shaft 2 via gearwheels ZR11 and ZR21 and shift element 46 to the countershaft 10 and, from the latter, via gearwheels ZR23 and ZR13 and shift element 23 to the transmission output shaft 3.

To engage fifth gear, shift elements 13 and 23 must be closed, wherein shift element 23 is closed first, and then shift element 13 is closed. In fifth gear, torque is transmitted from the transmission input shaft 2 via shift element 13 to gearwheel ZR13 and via shift element 23 directly to the transmission output shaft 3 (direct gear).

To engage a sixth gear, both shift elements 46 and 27 must be closed, wherein shift element 27 is closed first, and then shift element 46 is closed. In sixth gear, torque is transmitted from the transmission input shaft 2 via gearwheels ZR11 and ZR22 and shift element 46 to the countershaft 10 and, from the latter, via gearwheels ZR24, ZR14 and shift element 27 to the transmission output shaft 3.

To engage seventh gear, shift elements 13 and 27 must be closed, wherein shift element 27 is closed first, and then shift element 13 is closed. In seventh gear, torque is transmitted from the transmission input shaft via shift element 13 to gearwheel ZR13 and via gearwheel ZR23 to the countershaft 10. From the countershaft 10, torque is transmitted via gearwheels ZR24 and ZR14 and shift element 27 to the transmission output shaft 3.

FIG. 3 shows a traditional "H shift pattern", wherein reverse gear R is at the front left and the seventh gear is at the front right. The gear pairs 1, 2; 3, 4; 5, 6 are each situated one behind the other in a shift gate.

If one gear is to be disengaged and another gear to be engaged, the two instantaneously closed shift elements must first of all be opened. The transmission is therefore first of all shifted to an idling state, in which all the shift elements are open. The two shift elements of the desired target gear are then engaged in the sequence explained above.

Provision can be made for the idling state to be reached as soon as the shift lever is moved from an instantaneously engaged gear into the central shift gate (cf FIG. 3). To select the idling state, the shift lever thus does not necessarily have to be pivoted into the central position indicated by N. It is sufficient if the shift lever is disengaged from a previously engaged gear into the central shift gate 12 indicated in dashed lines.

Figure 4:
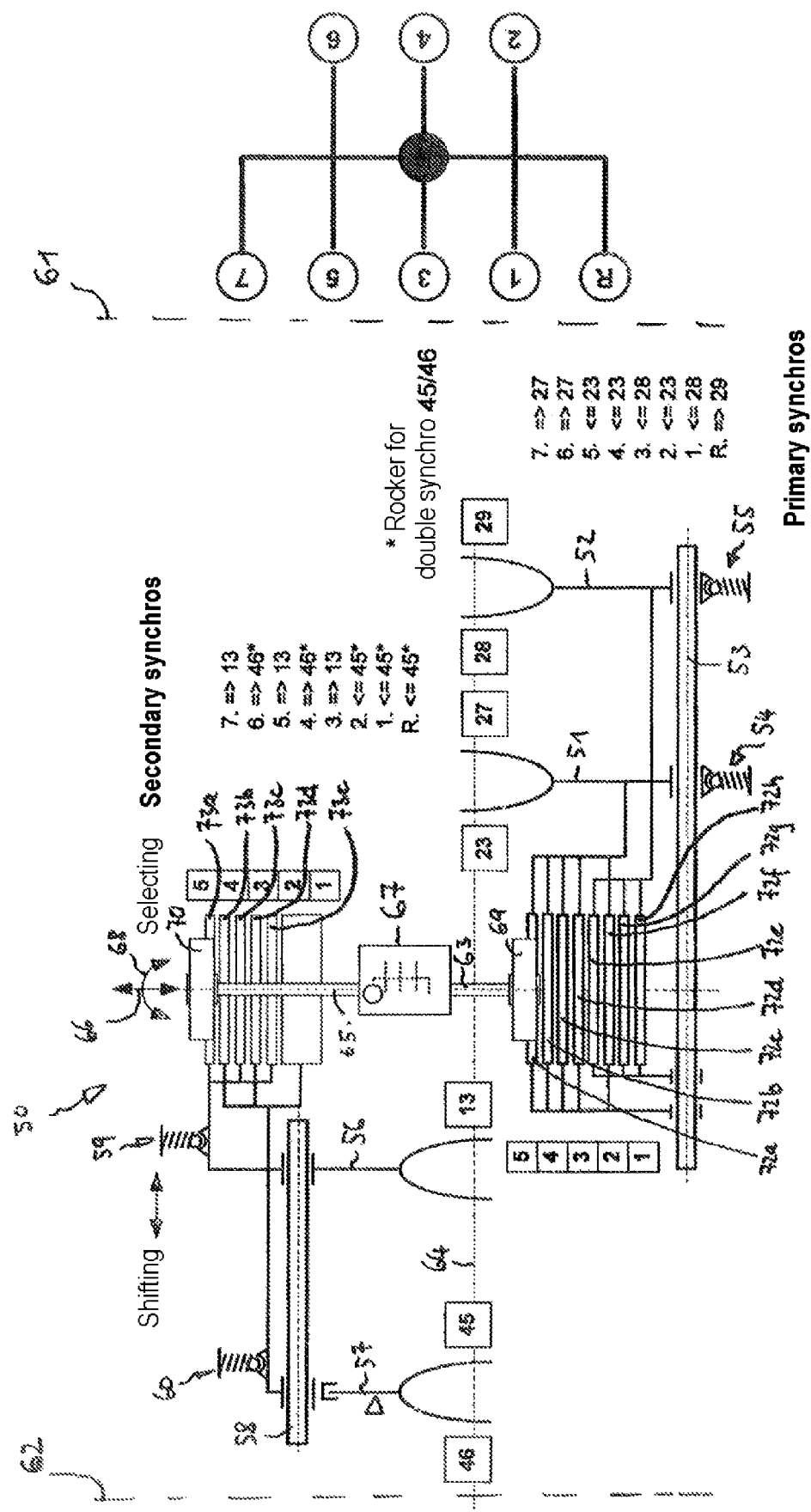
FIG. 4 illustrates the basic principle of a shifting device (internal shifting) according to an embodiment the invention.

FIG. 4 shows a shifting device 50, which is provided for shifting the shift elements 13, 23, 27, 28, 29, 45 and 46. The shift elements 23, 27, 28, 29, which are here indicated in a purely schematic way by squares, form a first group of shift elements, which are also referred to as "primary synchros". Shift elements 13, 45 and 46 form a second group of shift elements, which are also referred to as "secondary synchros". The individual shift elements can be sliding collars, for example, to each of which a synchronization device (not shown specifically here) can be assigned.

As can be seen from FIG. 4, the two primary synchros 23 and 27 can be actuated by a common shift fork or shift rocker 51, and the two primary synchros 28 and 29 can be actuated by a shift fork or shift rocker 52. In the case of shift forks, the two shift forks 51, 52 can be moved along a shift fork axis 53.

As can be seen from FIG. 4, each of the two shift forks 51, 52 is assigned a latching element 54 and 55, respectively. When shift fork 51 is in the central position thereof, in which both shift element 23 and shift element 27 are open, shift fork 51 is held in said central position by latching element 54. If shift fork 51 is moved to the left or right, which leads to the closure of shift element 23 or shift element 27, latching element 54 pushes shift fork 51 in a stable manner into the relevant closed position of shift element 23 or 27. Latching element 55 functions in the same way.

The secondary synchros 13, 45, 46 can likewise be actuated by shift rockers 56, 57 or by shift forks, which are arranged in such a way that they can be moved along a shift axis 58 or pivoted. Shift element 13 is assigned shift rocker 56. The two shift elements 45, 46 are assigned shift rocker 57. Shift rocker 56, in turn, is assigned latching element 59. Shift rocker 57 is assigned latching element 60.

As already mentioned, shift elements 23, 27, 28, 29 are referred to as primary synchros, and shift elements 13, 45, 46 are referred to as secondary synchros. The primary synchros are distinguished by the fact that, starting from an idling position, in which all the shift elements are open, it is always the case that, when a gear is engaged, a shift element of the primary synchros begins to close first and only when a shift element of the primary synchros has begun to close does a shift element of the secondary synchros begin to close. In the illustrative embodiment shown here, the first group of shift elements (formed by the primary synchros) is associated more closely with a transmission output 61 than the second group of shift elements (formed by the secondary synchros), which are associated more closely with a transmission input 62. However, this does not necessarily have to be the case. In principle, the reverse is also possible, i.e. the primary synchros could be arranged on the transmission input side and the secondary synchros could be arranged on the transmission output side.

Closer attention will be given below to details of the internal shift system, i.e. to the actuation of the individual shift rockers 51, 52, 56 and of shift rocker 57 and thus to the actuation of the individual shift elements 23, 27, 28, 29, 13, 45, 46.

The central element of the internal shift system is a selector shaft 63, which is arranged transversely to a longitudinal direction 64 of the transmission in the illustrative embodiment shown here. The selector shaft 63 has a longitudinal axis 65, along which it can be moved in translation, this being indicated by the double arrow 66. The selector shaft 63 can be moved into various predetermined translational positions, corresponding to the individual shift gates of the H shift pattern shown in FIG. 3. To ensure that individual shift gates are reached cleanly during movement of the selector shaft 63, a corresponding latching device 67 is provided.

In addition to the degree of freedom for translational movement along the longitudinal axis 65, the selector shaft 63 can be rotated about the longitudinal axis 65 thereof, this being indicated by the double arrow 68. Rotation of the selector shaft 63 brings about engagement and disengagement of individual shift elements of the first and second group of shift elements.

A master element is arranged at each of the two ends of the selector shaft 63, wherein one master element, which is assigned to the first group of shift elements, is referred to as a first master element 69, and the other master element, which is assigned to the second group of shift elements, is referred to as a second master element 70.

Figure 5:
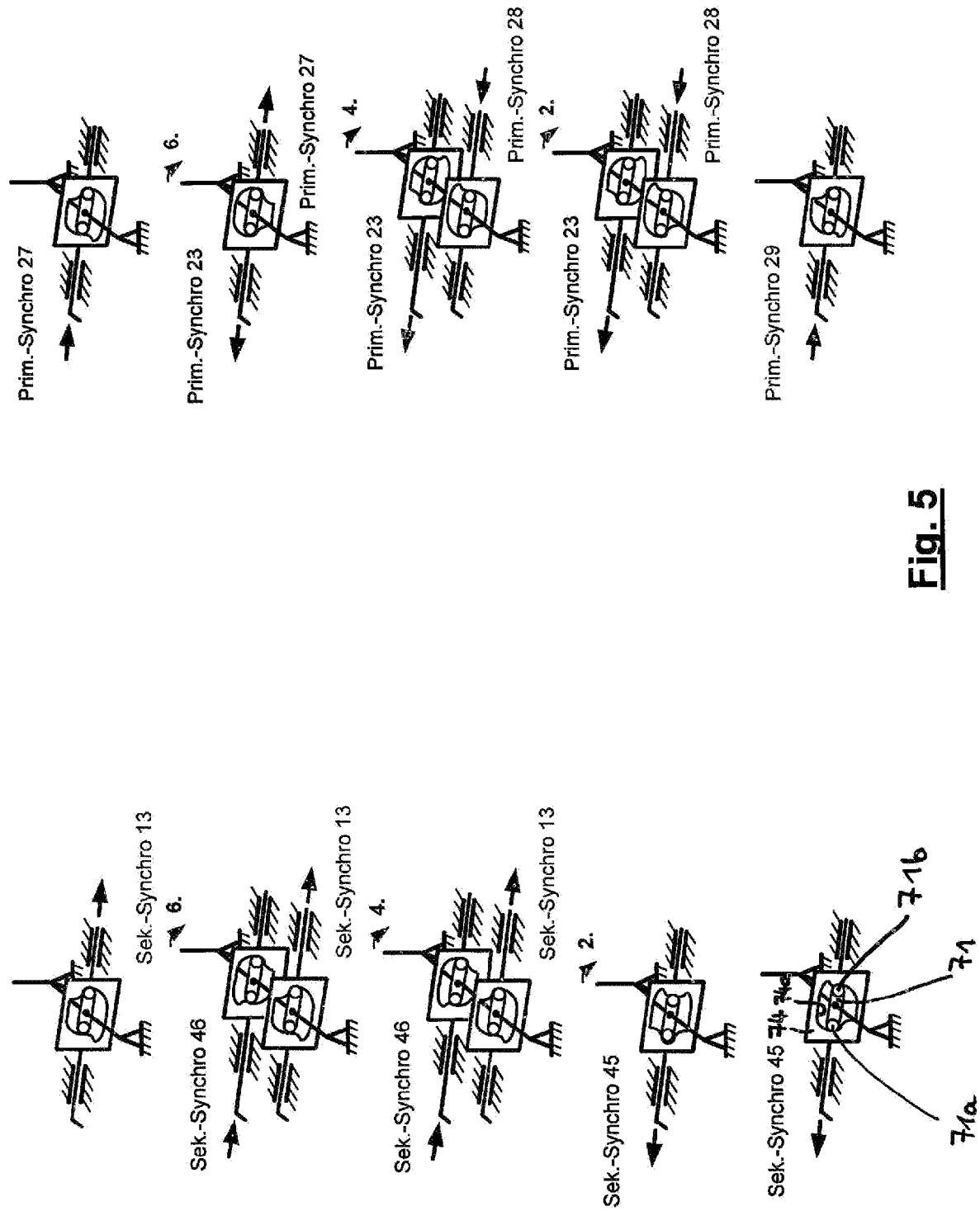
FIG. 5 illustrates the basic principle of the actuation of the individual shift frames by the associated master elements in the individual gears.

As explained in greater detail in conjunction with FIG. 5, the master elements can each be a double-armed lever 71 (cf FIG. 5) for example, at each of the ends of which a master roller 71a, 71b is rotatably arranged.

As can be seen from FIG. 4, the first group of shift elements is assigned a plurality of slave elements 72a, 72b, 72c, 72d, 72e, 72f, 72g, 72h arranged one behind the other in a register-like manner.

In the same way, the second group of shift elements is assigned a plurality of slave elements 73a, 73b, 73c, 73d, 73e arranged one behind the other in a register-like manner.

The first and second slave elements can each be what is referred to as a sliding frame 74, which in each case has an internal guide slot 74a, on which the rollers 71a, 71b of the associated master element 69 and 70, respectively, rest (cf FIG. 5). Turning the selector shaft 63 and thus the master elements 69 and 70 causes the rollers 71a, 71b to roll on the internal slotted track of the sliding frame 74. This in turn causes lateral translation of the relevant sliding frame in the longitudinal direction thereof, i.e. parallel to the longitudinal axis 64 of the transmission.

As can be seen from FIG. 4, slave elements 72a, 72b, 72c, 72d and 72f are connected to shift fork 51. Slave elements 72e, 72g and 72h are connected to shift fork 52.

Considering the slave elements assigned to the first group of shift elements, it can be seen that slave elements 73a, 73c and 73e are connected to shift fork 56. Slave elements 73b and 73d are connected to shift rocker 57.

As already mentioned several times, a particular shift gate can be selected by moving the selector shaft 63 in translation into one of its predetermined positions. Moving the selector shaft 63 in translation leads to a corresponding accompanying movement of the master elements 69, 70. Depending on the shift position of the selector shaft 63, the master elements 69, 70 engage in associated slave elements. In the translational position of the selector shaft 63 shown in FIG. 4, which corresponds to the shift gate of the seventh forward gear (cf FIG. 3), master element 69 engages in the internal slotted track of slave element 72a. The second master element 70 engages in the internal slotted track of slave element 73a. By moving the selector shaft 63 downward, other shift gates can be selected.

From the shift tables contained in FIG. 4, it can be seen which shift elements have to be shifted in which shift directions when engaging individual gears. If, for example, the intention is to engage fourth gear, the selector shaft 63 must first of all be moved into the shift gate assigned to third and fourth gear. Once the shift gate has been reached, the selector shaft 63 is rotated, more specifically in such a way that shift element 23 is closed first, and shift element 46 is closed with a time offset relative thereto. Shift element 23 is closed by sliding the shift fork 51 to the left. Shift element 46 is closed by sliding shift rocker 57.

Further details as to which shift frames are moved when engaging and disengaging individual gears and in what way can be seen from FIG. 5. The shift elements are kinematically controlled through the contouring of the "internal slotted track". A shifting movement x at the gear shift knob is converted into a rotary motion of the selector shaft and then into the actuating movement of the sliding frames at a "primary synchro (y1)" and at a "secondary synchro (y2)". While y1 already begins with a transmission ratio>1, y2 is still at zero and comes into action later in accordance with a law predetermined by the design. Once the shifting movement is complete, both "synchros" have arrived at the respective end stops thereof in the clutch teeth.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shifting device for shifting a transmission, comprising:
    a first group of shift elements;
    a second group of shift elements; and
    a selector shaft, which is arranged to be displaceable along a longitudinal axis and rotatable about the longitudinal axis, wherein
    by moving the selector shaft into one of a plurality of possible translational positions, at least one shift element of the first group and at least one shift element of the second group are simultaneously selected, and
    by rotating the selector shaft the selected shift elements are actuatable such that the selected shift elements are each simultaneously engaged for a period of time with an associated gearwheel, wherein the at least one selected shift element of the first group is actuated in phase with respect to the at least one selected shift element of the second group, or with an overlapping or offset phase displacement with respect to the at least one selected shift element of the second group,
    the selector shaft has a first master element assigned to the first group of the shift elements and a second master element assigned to the second group of shift elements, and
    the first and second master elements are each coupled rotatably to said selector shaft or are connected rigidly to said selector shaft.

2. The shifting device according to claim 1, wherein the selector shaft is arranged transverse to a longitudinal direction of an input or output shaft of the transmission.

3. The shifting device according to claim 1, wherein:
    a plurality of first slave elements is assigned to the first group of shift elements, each of the first slave elements being coupled to at least one shift element of the first group, and
    the first master element interacts with one of the first slave elements according to a sliding position of the selector shaft such that a rotary movement of the selector shaft and of the first master element coupled thereto is transmitted to the slave element of the first slave elements which is associated with the respective sliding position of the selector shaft, and is transmitted from said slave element to the at least one shift element of the first group which is coupled thereto.

4. The shifting device according to claim 3, wherein:
    a plurality of second slave elements assigned to the second group of shift elements, each of the second slave elements being coupled to at least one shift element of the second group, and
    the second master element interacts with one of the second slave elements according to a sliding position of the selector shaft such that a rotary movement of the selector shaft and of the second master element coupled thereto is transmitted to the slave element of the second slave elements which is associated with the respective sliding position, and is transmitted from said slave element to the at least one shift element of the second group which is coupled thereto.

5. The shifting device according to claim 4, wherein the plurality of first and second slave elements each have a slotted track along which the associated first or second master element slides or on which the associated first or second master element rolls, whereby the associated slave element is allowed to move in translation.

6. The shifting device according to claim 5, wherein the first master element and/or the second master element has a lever arm on which a roller is rotatably arranged, said roller resting on the slotted track of one of the first or second slave elements.

7. The shifting device according to claim 6, wherein the lever arm has a double-armed construction, the roller being rotatably arranged on each of the two ends of the lever arm.

8. The shifting device according to claim 7, wherein the master elements and the slave elements are matched to one another such that, when the selector shaft is turned, starting from a state in which all the shift elements are open, for all possible shift operations one shift element of the first group always begins to close first and only after the one shift element of the first group has begun to close does one shift element of the second group begin to close.

9. The shifting device according to claim 8, wherein at least one shift element of the first group is coupled to at least two first slave elements.

10. The shifting device according to claim 9, wherein at least one shift element of the second group is coupled to at least two slave elements.

11. The shifting device according to claim 10, wherein the first slave elements are arranged one behind another in a first row.

12. The shifting device according to claim 11, wherein the second slave elements are arranged one behind the other in a second row.

13. The shifting device according to claim 1, further comprising:
    a manually actuated shift lever coupled only mechanically to the selector shaft, wherein
    the selector shaft is moveable into individual shift gates by pivoting the shift lever in a vehicle transverse direction, and the selector shaft is turned by pivoting the shift lever in a vehicle longitudinal direction.

14. The shifting device according to claim 13, wherein the first group of shift elements is closer to an output of the transmission than the second group of shift elements.

15. The shifting device according to claim 13, wherein the second group of shift elements is closer to an output of the transmission than the first group of shift elements.

16. The shifting device according to claim 13, further comprising:
    a latching device defining a plurality of translational positions of the selector shaft, the plurality of locations corresponding to the individual shift gates.

17. The shifting device according to claim 1, wherein the first master element is arranged at a first end of the selector shaft and the second master element is arranged at a second end of the selector shaft.

18. The shifting device according to claim 1, wherein the shift element is a shift collar.

* * * * *